Jan. 26, 1932.   F. C. CRAWFORD ET AL   1,842,747
TIE ROD END
Filed Feb. 26, 1926    2 Sheets-Sheet 2

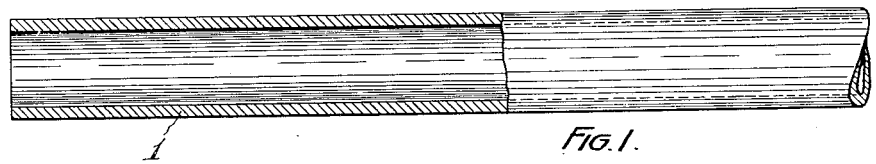
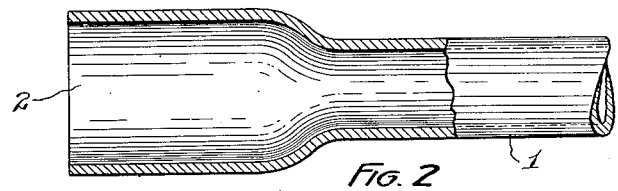
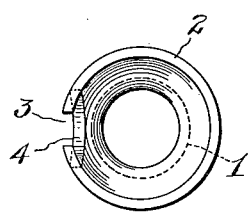
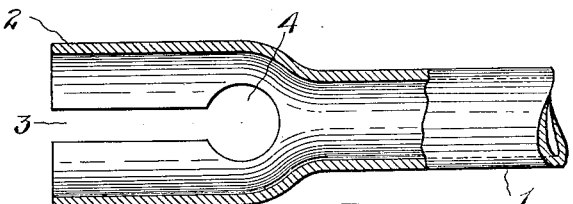
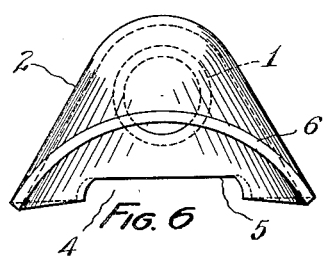
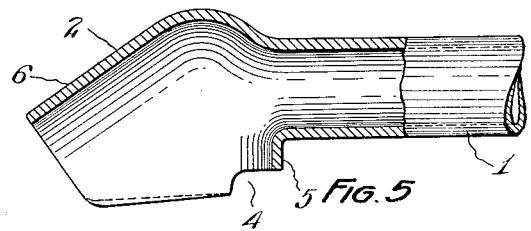
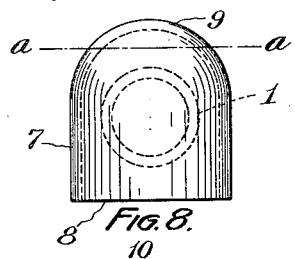
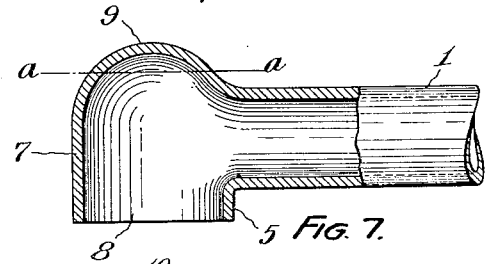
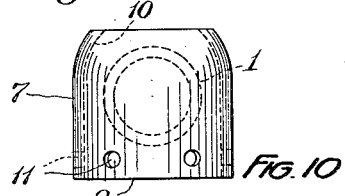
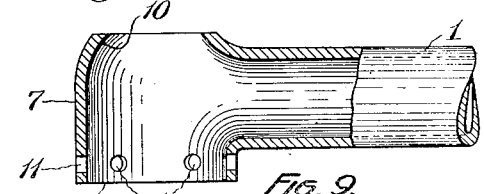
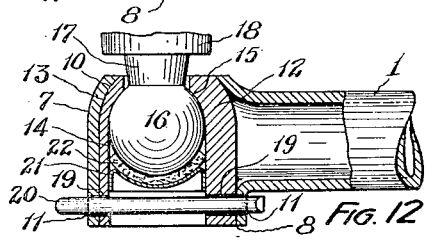
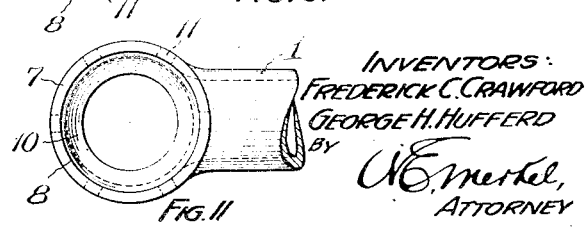

INVENTORS:
FREDERICK C. CRAWFORD
GEORGE H. HUFFERD
BY
AE Merkel
ATTORNEY

Patented Jan. 26, 1932

1,842,747

UNITED STATES PATENT OFFICE

FREDERICK C. CRAWFORD AND GEORGE H. HUFFERD, OF DETROIT, MICHIGAN, ASSIGNORS TO THOMPSON PRODUCTS INC., OF CLEVELAND, OHIO, A CORPORATION OF OHIO

TIE ROD END

Application filed February 26, 1926. Serial No. 90,899.

The invention relates to connecting rods such as tie-rods and drag links for automobiles, the ends of which are adapted to house a rod coupling such as is customarily employed in such structures, e. g., a ball stud and cooperating ball seat, and to a process for making the same, and also to a rod coupling of specific form. In its specific embodiment our invention is especially useful in tie-rods for automobiles. The tie rod of an automobile is that rod which connects together two rigid arms projecting from the steering knuckles of the front wheels of an automobile, whereby they are caused to turn in unison when one of them is operated by the steering wheel.

For proper steering of an automobile it is necessary to give the front wheels what is known as a "toe-in", i. e., the front wheels must be arranged in planes, not vertical and parallel, but in planes slightly converging toward the front. As the tie rod is rigidly connected to the opposite steering knuckles and as the front stub axles are also rigid therewith, it is apparent that in order to give the front wheels the proper "toe-in" under all conditions, some means of adjustment of the tie rod or joint connections is necessary. In the usual construction, in order to provide this adjustment, the tie rod is made of two end members and an intermediate member, which are relatively adjustable.

It is the object of this invention to provide a very light, yet strong, connecting rod, rigid from end to end and without joints for the adjustable extension thereof, and to so devise a cooperating ball joint as to permit the required adjustment in the joint itself.

To this end we have invented a new process for treating a light, seamless metal tube, a novel construction of connecting rod, and a specific form of ball joint.

The novel connecting rod may be produced by different methods, and herein are disclosed two methods, one of which is a sole invention, and, in its specific details, forms the subject-matter of application Serial No. 90,841 filed February 26, 1926, by George H. Hufferd. The accompanying drawings show one end of the connecting rod and illustrate the methods employed to fashion it.

Referring to the annexed drawings:

Figure 1 is a view of a seamless metal tube, partly in section, from which the connecting rod is made;

Fig. 2 illustrates the tube after the end has been expanded and upset to proper diameter;

Fig. 3 illustrates the next step which consists in slotting one wall of the expanded end;

Fig. 4 is an end view thereof;

Fig. 5 shows the next step, by which the slotted expanded end illustrated in Fig. 3 is spread open and flanged back, into a shape similar to a scoop;

Fig. 6 is an end view of Fig. 5;

Fig. 7 illustrates the next step by which the scoop, shown in Fig. 5, is drawn into the form of a cylinder having its axis at right angles to the axis of the tube;

Fig. 8 is an end view thereof;

Fig. 9 illustrates the next step which consists in cutting off the closed end of the cylinder illustrated in Fig. 7, along the dotted line a—a;

Fig. 10 is an end view thereof;

Fig. 11 is a bottom plan view of the part shown in Fig. 9;

Fig. 12 is a view, in section, of the connecting rod and cooperating ball joint assembled therewith;

Figure 13:
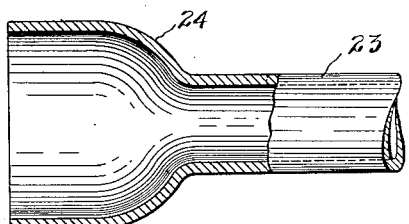
Fig. 13 illustrates the expanded and upset end of the tube as the result of the first step in a modified process.

Referring to the drawings in detail in which the same reference character is used throughout to indicate the same part, and particularly to Figs. 1 to 12, the process is begun with a light, seamless, metal tube 1, the end of which is enlarged and expanded, as illustrated at 2, the extent of the enlargement depending upon the size of the ball joint housing or similar part which it is desired to form upon the end of the tube. In the process of enlargement it is obvious that the same metal which forms the wall of the tube must also constitute the wall of the enlargement, from which it follows that, if the end of the tube is subjected to the process of expansion alone, the resulting wall will be much thinner than the untreated wall of the tube. If it is desired to retain, in the enlargement, the original thickness of the tube wall, it is necessary to subject the treated part of the tube to the process of upsetting or thickening, which is a well known operation, and which may take place simultaneously with the operation of expansion in a manner known to the art. After the end of the tube has been expanded to the desired extent, a slot 3 is formed in the enlarged portion, preferably terminating at its inner end in a circular aperture 4.

After the slot has been formed, the end is shaped into the scoop-like form indicated in Figs. 5 and 6 by spreading the slotted end and flanging the metal about a portion of the circular aperture 4, the flange 5 forming a portion of a cylinder which is completed in the succeeding step. Hereinafter the end of the tube, at this point of the process, will be referred to as the "scoop," designated as a whole by reference numeral 6. The step of forming the scoop 6 may be done by known shaping operations; the scoop 6 is then drawn into the form of a cylinder, as indicated at 7, having an open end 8 and a closed end 9 which is preferably spherically curved as indicated in the drawings, but may be of any other form so long as the elements of the interior surface are circular to permit rotation thereon of a cooperating ball seat. After the scoop is drawn into the cylinder 7, the metal at the open end 8 will not be of regular formation, such as indicated in Figs. 7 and 8, but will be of irregular formation, requiring a trimming operation to bring it to a circular edge lying in a plane parallel with the axis of the tube, as indicated in Figs. 7 and 8. Instead of trimming the edge after the drawing operation, the metal at the end of the scoop 6 may be trimmed away to a shape which will give the desired finish to the end 8 when the drawing operation has been completed; or the edges may be trimmed before the operation sufficient to effectively perform the drawing operation and again trimmed after the cylinder has been formed. The time when the trimming step is to be performed is a matter of choice.

After the formation of the cylinder 7 the closed end 9 thereof is cut away on the line a—a, as indicated on Figs. 7 and 8, by which a portion of the end 9 remains to form a drawn-in or contracted end having an interior bearing surface 10 (Fig. 9), the remainder of the cylinder 7 being of the same diameter throughout. In the use as a tie rod or drag link, specifically contemplated for the completed article, the bearing surface 10 will be uppermost. At the lower end 8 a series of apertures 11 is provided for the purpose hereinafter explained.

The cylindrical end of the rod as thus completed, forms a ball-joint housing whose axis is at right angles to the axis of the rod. This housing is adapted to receive a cylindrical ball seat 12 (Fig. 12), having an outer surface 13 at its upper end adapted to cooperate with the bearing surface 10 of the housing, and an eccentrically arranged bore 14 extending therethrough spherically curved at its upper end, as indicated at 15, upon which bears the ball 16 of a ball stud, the shank 17 of which extends upwardly and forms a bearing surface for a connected part 18. The ball seat and its relation to the housing, as thus far described, is not of our invention, but is the invention of another, and is a part of the subject-matter of application Serial No. 76,448 filed December 19, 1925 by Matthew P. Graham. However, we have devised a novel means for closing the end of the ball seat and holding it in adjusted relation to the housing. This novel means consists of a series of apertures 19 in the ball seat 12, adapted to register with the apertures 11 in the ball joint housing, and, when registered, to receive a cotter pin 20, or the like. The lower end of the ball seat is preferably closed by a curved plate 21 between which and the ball 16, is a soft felt washer 22. In order to adjust the position of the shank 17 with respect to the body of the rod the cotter pin 20 is removed, the ball seat 12 is rotated in the housing by any suitable means, the pin is passed through a set of registering apertures 11, 19, and the pin again is secured from accidental withdrawal.

Our new article may be produced in other ways, and we will now describe another method which is the invention of one of us, reference being had to Figs. 13 to 20 of the annexed drawings illustrating the steps thereof.

Figure 14:
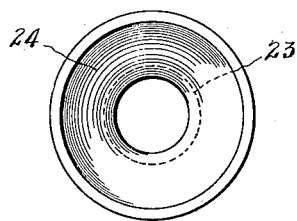
Fig. 14 is an end view thereof.
Figure 15:
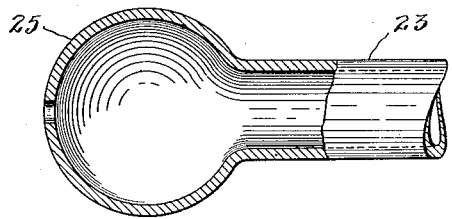
Fig. 15 shows the end of the tube after it has been spun into the form of a substantial sphere.
Figure 16:
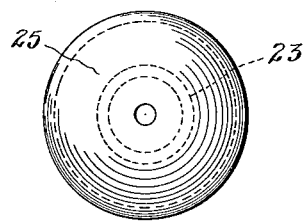
Fig. 16 is an end view thereof.
Figure 17:
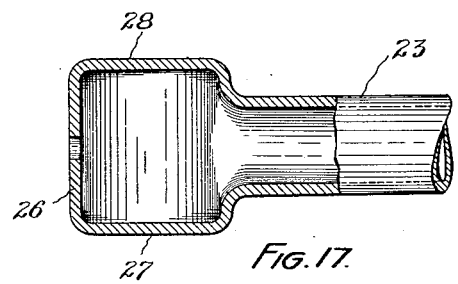
Fig. 17 illustrates the end after the next step has been performed, which consists in forming the spherical end into a cylinder.
Figure 18:
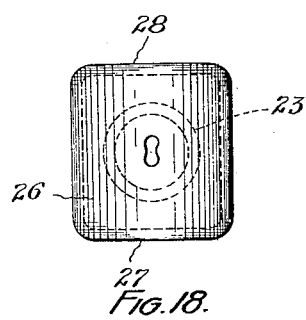
Fig. 18 is an end view thereof.
Figure 19:
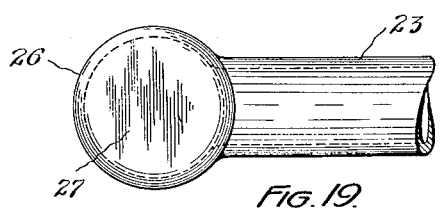
Fig. 19 is a bottom view of the part shown in Fig. 17.
Figure 20:
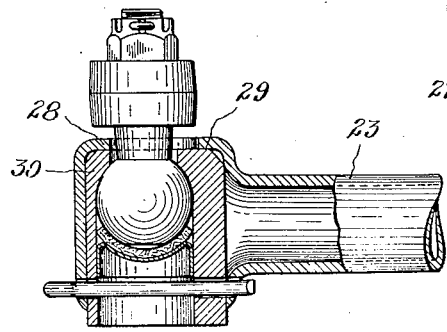
Fig. 20 is a view of the connecting rod end as completed and assembled with a ball joint.

A seamless metal tube 23 is expanded at its end (and also upset if the desired thickness of wall cannot be otherwise obtained as above indicated), as illustrated in Figs. 13 and 14, preferably so as to have a segmental spherical portion 24 integral with the body of the tube 23. The free edge of the enlargement is then spun or formed into substantially spherical shape, as illustrated at 25, in Figs. 15, 16. The spherical enlargement 25 is then formed, preferably by dies, into a cylinder 26, as illustrated in Figs. 17, 18 and 19, whose axis is at right angles to the axis of the tube 23. Thereafter one wall 27 is completely removed, and a concentric part of the opposite wall 28 is partly removed so as to leave an annular shoulder 29, (Fig. 20) adapted to form an abutment and bearing surface for a ball seat 30, such as has been described in connection with Figs. 1 to 12. The cylinder thus forms a ball-tight housing, which is provided with a series of apertures at the end opposite the shoulder 29, for a purpose above indicated.

In connection with the process first described, we have illustrated a spherical, segmental bearing surface in the housing to cooperate with the upper end of the ball seat, while the second process we have described as resulting, preferably, in a substantially right-angled shoulder; but this bearing surface may be formed in either way by either process, or of other form (conical, for example) if desired.

In the description above it is stated that the end of the tube to be formed for receiving a ball-joint may be expanded without upsetting, or expanded and also upset, depending upon the characteristics of the resulting article desired, but as it is ordinarily desirable to have the greatest strength of such a part with the least weight, it will be found best to upset the expanded or enlarged portion of the tube so that the housing will have a strength equal to that of the body of the tube. In the following claim which specifies the step of expanding the end of a metal tube the expression is to be understood as also covering the step of upsetting the metal whenever such is deemed to be desirable.

It will be apparent that by the methods above described which may be varied in detail, there may be produced a one-piece connecting rod which is very light and strong, firm and safe in use, which may be made at low cost, and which presents an additional decided advantage over prior constructions, in that the end projects beyond the center of the ball stud only to an extent sufficient to provide the necessary bearing and adjustment for the ball. While specific methods and constructions have been described, it is obvious that they may be varied in detail. It is therefore to be understood that the invention is not confined to the specific details described but includes all steps and constructions falling within the terms of the appended claim.

What we claim is:

In a rod coupling comprising a tubular connecting rod having an integral cylindrical ball-joint housing at its end with its axis at right angles to the axis of the rod, a ball-seat retaining-shoulder at one end of the housing and a series of apertures in the wall at the other end, a ball seat in the housing resting against the shoulder and having an eccentric bore and a plurality of apertures adapted to register with the apertures in the housing, and means cooperating with the apertures in the housing and ball-seat to retain the ball-seat in adjusted position.

Signed by us this 22nd day of January, 1926.

GEO. H. HUFFERD.
FREDERICK C. CRAWFORD.